US008271678B2

(12) United States Patent
Wetherall et al.

(10) Patent No.: US 8,271,678 B2
(45) Date of Patent: Sep. 18, 2012

(54) INDEPENDENT DETECTION AND FILTERING OF UNDESIRABLE PACKETS

(75) Inventors: David J. Wetherall, Seattle, WA (US);
Stefan R. Savage, Carlsbad, CA (US);
Thomas E. Anderson, Seattle, WA (US)

(73) Assignee: Arbor Networks, Inc., Chelmsford, MA (US)

( * ) Notice: Subject to any disclaimer, the term of this patent is extended or adjusted under 35 U.S.C. 154(b) by 2960 days.

(21) Appl. No.: 09/825,139

(22) Filed: Apr. 3, 2001

(65) Prior Publication Data
US 2002/0143980 A1 Oct. 3, 2002

(51) Int. Cl.
G06F 15/16 (2006.01)
(52) U.S. Cl. .......................... 709/232; 709/227
(58) Field of Classification Search .................. 709/200, 709/224, 232, 201–203, 217–219, 227–229; 713/201
See application file for complete search history.

(56) References Cited

U.S. PATENT DOCUMENTS

| 5,499,297 | A | | 3/1996 | Boebert |
| 5,560,008 | A | | 9/1996 | Johnson et al. |
| 5,577,209 | A | | 11/1996 | Boyle et al. |
| 5,699,513 | A | | 12/1997 | Feigen et al. |
| 5,835,724 | A | * | 11/1998 | Smith ........................... 709/227 |
| 5,933,602 | A | * | 8/1999 | Grover ........................... 709/224 |
| 5,978,373 | A | | 11/1999 | Hoff et al. |
| 6,269,402 | B1 | * | 7/2001 | Lin et al. ........................ 709/227 |
| 6,363,489 | B1 | * | 3/2002 | Comay et al. ................. 713/201 |
| 6,522,631 | B2 | * | 2/2003 | Rosborough et al. ......... 370/252 |
| 6,598,077 | B2 | * | 7/2003 | Primak et al. ................. 709/219 |
| 6,615,262 | B2 | * | 9/2003 | Schweitzer et al. .......... 709/224 |
| 6,678,270 | B1 | * | 1/2004 | Garfinkel ...................... 370/392 |
| 6,799,270 | B1 | * | 9/2004 | Bull et al. ...................... 713/153 |
| 2002/0002686 | A1 | * | 1/2002 | Vange et al. .................. 713/201 |
| 2002/0108059 | A1 | * | 8/2002 | Canion et al. ................. 713/201 |

* cited by examiner

Primary Examiner — Yasin Barqadle
(74) Attorney, Agent, or Firm — Houston & Associates, LLP

(57) ABSTRACT

A server, using a deterministic function, a secret value and persistent information of a packet, destined for a client device, generates and includes a conversation identifier for inclusion with the packet. The client device in turn includes the conversation identifier in a subsequent packet sent by the client device destined for the server. An intermediate routing device having knowledge of the deterministic function and the secret value, upon receiving the packet en-route from the client device to the server, would independently determine whether the packet is a part of a conversation between the client and the server, by independently verifying the included conversation identifier, and forward or not forward the packet accordingly. As result, undesirable packets may be independently detected and filtered for the server.

4 Claims, 7 Drawing Sheets

INDEPENDENT DETECTION AND FILTERING OF UNDESIRABLE PACKETS

BACKGROUND OF THE INVENTION

1. Field of the Invention

The present invention relates to the field of networking. More specifically, the present invention relates to the detection of undesirable packets headed for a server.

2. Background Information

With advances in integrated circuit, microprocessor, networking and communication technologies, increasing number of devices, in particular, digital computing devices, are being networked together. Devices are often first coupled to a local area network, such as an Ethernet based office/home network. In turn, the local area networks are interconnected together through wide area networks, such as ATM networks, Frame Relays, and the like. Of particular relevance is the TCP/IP based global inter-networks, Internet.

As a result of this trend of increased connectivity, increasing numbers of applications that are network dependent are being deployed. Examples of these network dependent applications include but are not limited to, email, net based telephony, world wide web and various types of e-commerce. Success of many of these content/service providers as well as commerce sites depend on the quality of service that they provide.

Unfortunately, the connectivity that makes it possible for these servers to provide the content/service, also makes it very easy for hackers to launch denial of service (DOS) attacks against these servers. As a result, techniques for detecting and thwarting undesirable network traffic have become a subject of great interest to the artesian. For example, in co-pending U.S. patent application Ser. No. 09/631,898 entitled "A Distributed Solution For Regulating Network Traffic", a distributed approach for detecting undesirable traffic is disclosed. In co-pending U.S. patent application Ser. No. 09/685,518, entitled "Progressive and Distributed Regulation of Selected Network Traffic Destined for A Network Node", a progressive approach to regulating undesirable network traffic is disclosed. While these and other approaches work well and offer various advantages, it is nevertheless further desirable to be able to enable routing devices in a network to be able to independently detect undesirable traffic, and take appropriate action to thwart such traffic as soon as they are detected.

SUMMARY OF THE INVENTION

A server, using a deterministic function, a secret value and persistent information of a packet, destined for a client device, generates and includes a conversation identifier for inclusion with the packet. The client device in turn includes the conversation identifier in a subsequent packet sent by the client device destined for the server. An intermediate routing device having knowledge of the deterministic function and the secret value, upon receiving the packet en-route from the client device to the server, would independently determine whether the packet is a part of a conversation between the client and the server, by independently verifying the included conversation identifier, and forward or not forward the packet accordingly. As result, undesirable packets may be independently detected and filtered for the server.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as nonce, identifiers, generating, inserting receiving, analyzing, determining, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor includes microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. The terms "routing devices" and "route" are used throughout this application, in the claims as well as in the specification. The terms as used herein are intended to be genus terms that include the conventional routers and conventional routing, as well as all other variations of network trafficking, such as, switches or switching, gateways, hubs and the like. Thus, unless particularized, the terms are to be given this broader meaning. Further, the description repeatedly uses the phrase "in one embodiment", which ordinarily does not refer to the same embodiment, although it may.

Overview

Figure 1:
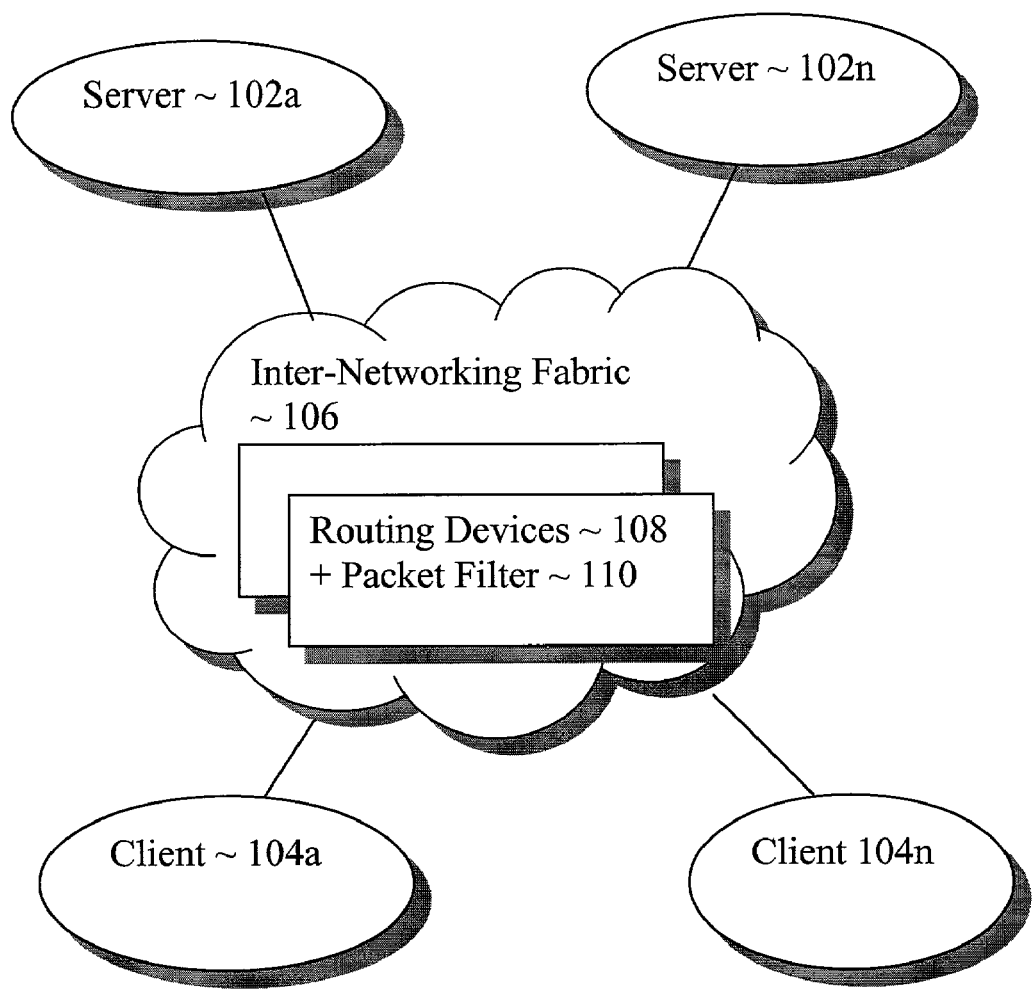
FIG. 1 illustrates an overview of the present invention, including a routing device having a packet filter incorporated with the teachings of the present invention, in accordance with one embodiment.
Figure 2:
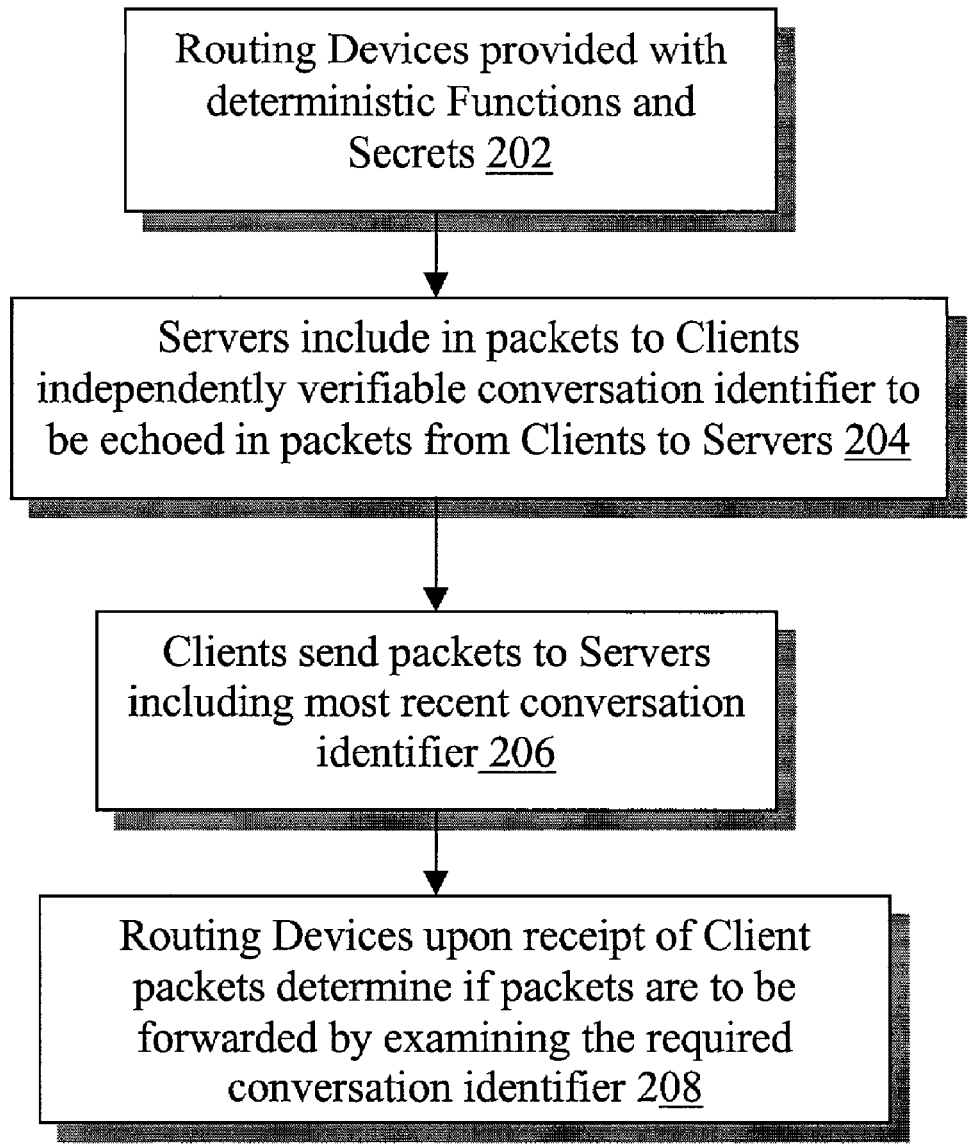
FIG. 2 illustrates a method view of the same invention, in accordance with one embodiment.

Referring now first to FIGS. 1-2, wherein two block diagrams illustrating a network view and a method view of the present invention, in accordance with one embodiment, are shown. As illustrated by these figures, in accordance with the present invention, selected ones of routing devices 108 dispersed in internetworking fabric 106 are advantageously equipped with packet filters 110 incorporated with the teachings of the present invention (block 202) to enable routing devices to independently detect and filter undesirable packets for selected ones of servers 102a-102n. More specifically, for the illustrated embodiment, packet filters 110 are equipped/configured with the same deterministic functions and provided with the secret values employed by selected ones of servers 102a-102n to generate independently verifiable conversation identifiers employed by these selected ones of servers 102a-102n to enable these selected ones of routing devices 108 to determine whether received packets destined for these selected ones of servers 102a-102n are desirable packets, i.e. whether they are packets of conversations between the transmitting client devices 104a-104n and the destined ones of servers 102a-102n.

During operation, these selected ones of servers 102a-102n would include in packets transmitted to client devices 104a-104n these independently verifiable conversation identifiers (block 204). As will be described in more detail below, in addition to the employment of a deterministic function and a secret value, these independently verifiable conversation identifiers are also generated using selected ones of persistent packet field values.

Client devices 104a-104n, upon receipt of these independently verifiable conversation identifier included packets, would extract and save the conversation identifiers. In due course, when the occasions arise for client device 104a-104n to send packets to servers 102a-102n, client device 104a-104n would correspondingly include the latest saved ones of these conversation identifiers in the packets (block 206), to identify the packets as being packets that are part of conversations with servers 102a-102n.

Routing devices 108, on the other hand, upon receipt of packets destined for servers 102a-102n that they are configured to additionally provide the independent undesirable packet detection and filtering service would independently verify each received packet to determine whether the received packet is to be considered as a part of a conversation between the transmitting client device and the destination server (block 208). Routing devices 108 make the determination by independently verifying the included conversation identifiers.

As a result, undesirable packets destined for servers 102a-120n may be advantageously detected and filtered by selected ones of routing devices 108 independently. As those skilled in the art would appreciate, under the novel approach of the present invention, the advantageous independent detection and filtering is effectuated notwithstanding the fact that the packets transmitted from servers 102a-102n to client devices 104a-104n may or may not be routed through the same routing devices 108. Specifically, there is no requirement for routing devices 108 to maintain state flow information in order to accomplish the independent detection and filtering. This ability of allowing any properly equipped routing device 108 to independently analyze and make a judgment on a received en-route packet enables any routing device 108 disposed in any one of a number of locations in internetworking fabric 106 to be so configured as to perform the independent undesirable packet detection and filtering. Thus, the present invention enhances the ability to provide early detection and filtering of undesirable packets, soon after the undesirable packets enter the network.

Still referring to FIGS. 1-2, except for the teachings of the present invention incorporated with selected ones of routing devices 108, servers 102a-102n and client devices 104a-104n, these elements, including internetworking fabric 108, are intended to represent a broad range of servers, client devices, routing devices, and public/private networks known in the art. Routing devices 108 e.g. may be routers, switches, and the like, available from CISCO Systems of San Jose, CA, or Juniper Network, of Sunnyvale, CA. Servers 102a-102n may be servers available from Sun Microsystems of Menlo Park, CA, or IBM of Armonk, NY, whereas client devices 104a-104n e.g. may be computing devices of any form factors, from desktop to palm sized, available from Hewlett Packard of Palo Alto, CA. Internetworking fabric 106 may be inter-networked (wired and/or wireless) private networks of a private enterprise, or public networks (such as the Internet). Thus, except for the teachings of the present invention, these elements will not be otherwise described.

Before proceeding to describe the present invention further, it should be noted that the distinction between server and client is made for ease of understanding. The term "client" as used herein refers generally to a network node that initiates a request for service and the term "server" as used herein refers generally to a network node that responds to a request for service. Accordingly, network node may be a client in one transaction at one point in time, and a server in another transaction at a different point in time. Moreover, the present invention applies equally to client-server computing as well as peer-to-peer environments. A "server" may also be a load balancing proxy, firewall and the like.

Servers

Figure 3:
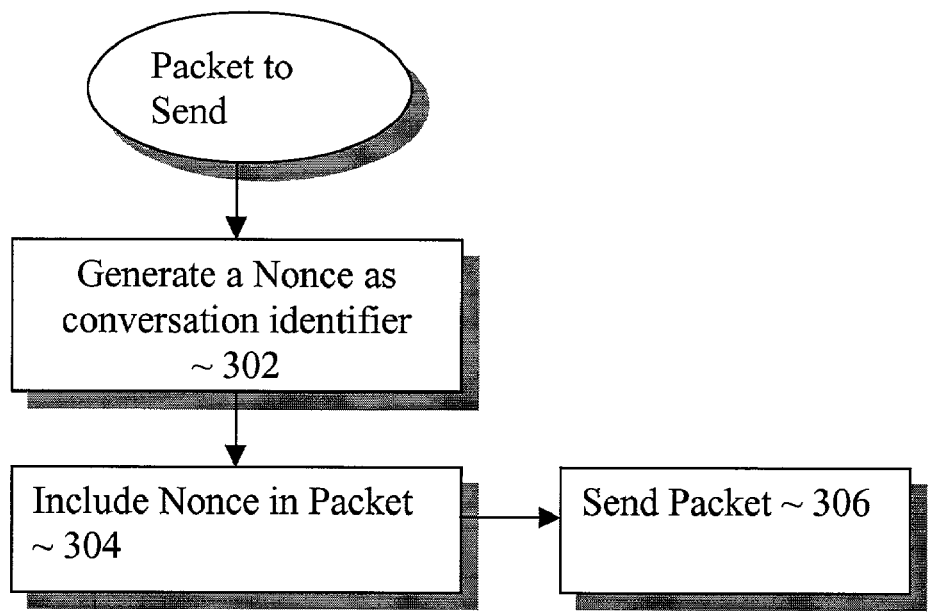
FIGS. 3-4 illustrate the operational flow of the relevant aspects of a server, and a component view of the relevant elements of a communication interface of the server, in accordance with one embodiment.
Figure 4:
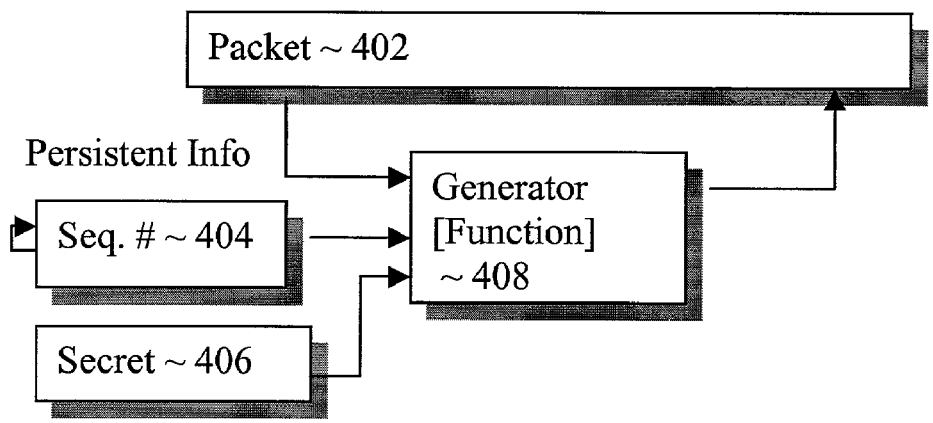

FIGS. 3-4 illustrate the operational flow of the relevant aspects, and relevant components of a server, in accordance with one embodiment. The illustrated embodiment employs a nonce as the conversation identifier. In alternate embodiments, other independently verifiable means to associate a packet with a conversation between a server and a client device may be employed instead. In one embodiment, the illustrated relevant components of FIG. 4 are disposed in a communication interface, e.g. a network interface card (NIC), designed to send and receive packets on behalf of the host server (more specifically, its processor or processors (not shown)).

As illustrated in FIG. 3, as a packet transmission occasion arises, a nonce is generated for used as a conversation identifier (block 302), i.e. for subsequent inclusion by client devices in packets transmitted from client devices to the host server, and independently examined by intermediate routing devices. In one embodiment, the nonce is generated using a deterministic function with a secret value and a number of persistent field values of the packet as input values to the deterministic function. In one embodiment, the persistent field values include the source and destination addresses of the packet. The source and destination addresses for packets transmitted between the host server and the client devices are "persistent" as in combination they are expected to be present in either direction of transmission, although the addresses may be "swapped" in roles, i.e. in one direction the server/client address is the source address, while in another it is the destination address. In one embodiment, the deterministic function is a selected one of a number of Message Authentication Codes (MAC) functions, such as HMAC, known in the art.

In one embodiment, the nonce is generated with the deterministic function being also provided with a corresponding sequence number of the nonce as an input value. The inclusion of another input value such as a "running" sequence number of the nonce advantageously changes the nonce during the course of conversation, making it more difficult for a hacker to discern the required nonce to denote a packet as a legitimate packet of a conversation between the server and the client devices. In other embodiments, other persistent field values, such as certain port numbers (e.g. source and destination ports of a transport protocol like TCP or UDP), may also be employed. Similarly, in alternate embodiments, other deterministic functions, such as well known universal hash functions, may be employed instead. Further, the hash function may be optionally followed by a cryptographically secure encryption.

Upon generation, the nonce is included in the packet to be transmitted, block 304, and the packet is transmitted thereafter, block 306, including the generated nonce as a conversation identifier for identifying any subsequent packets as part of a conversation between the server and the client devices (until the nonce "expires"). In one embodiment, the sequence number of the nonce is also included. In one embodiment, the nonce and its sequence number are included in a special field reserved for the specification of a conversation identifier per a communication protocol. In another embodiment, for compatibility, the nonce and the sequence number are included in an optional field of a communication protocol, such as the timestamp field of TCP/IP packets, or encoded into an existing field of a communications protocol, such as the identification field of IP packets.

As illustrated in FIG. 4, for the embodiment, the relevant components of the communication interface of the host server include generator 408 and a transmit interface. Generator 408 includes a deterministic function configured to generate a nonce based on a number of input values, including selected persistent information extracted from the packet and a secret value. Generator 408 "adds" the generated nonce into a predetermined field of the packet to be transmitted by the transceiver. For the embodiment, the components include register 406 for holding the secret value. Further, the input values to generator 408 include a sequence number of the nonce to be generated, and the components include counter 404 for generating the sequence number of the nonce.

Client Devices

Figure 5:
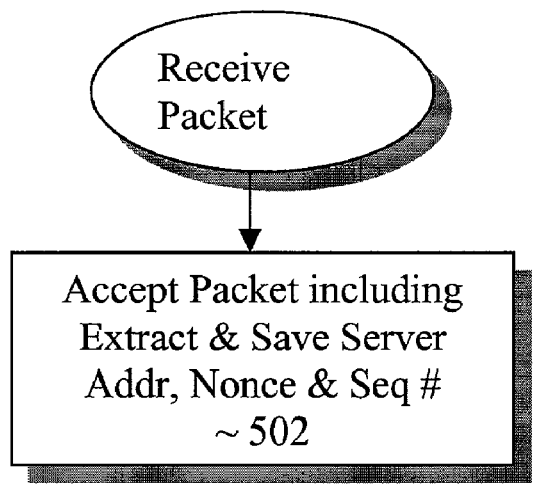
FIGS. 5-7 illustrate the operational flow of the relevant aspects of a client device, and a component view of the relevant elements of a communication interface of the client device, in accordance with one embodiment.
Figure 6:
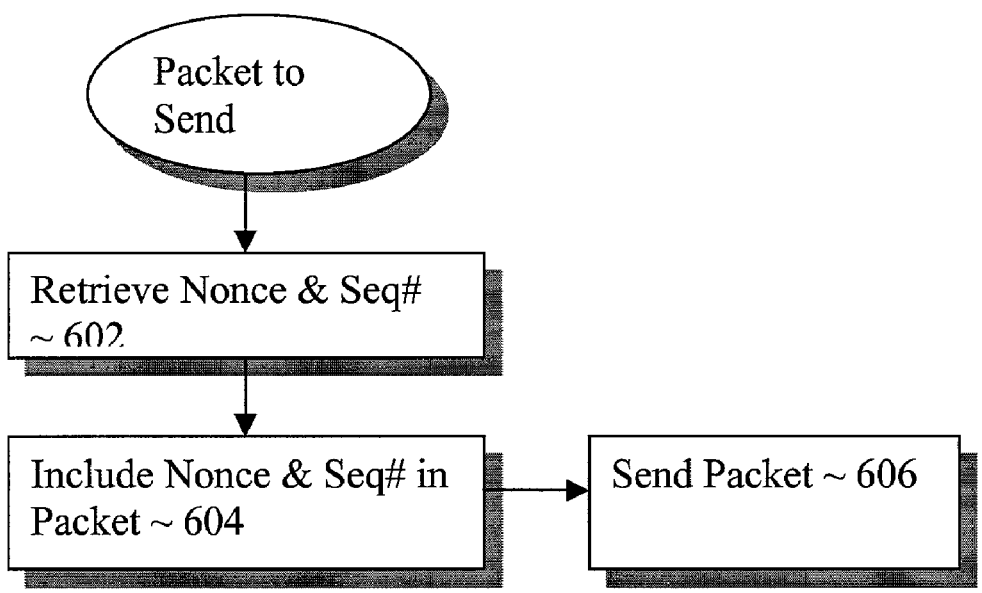
Figure 7:
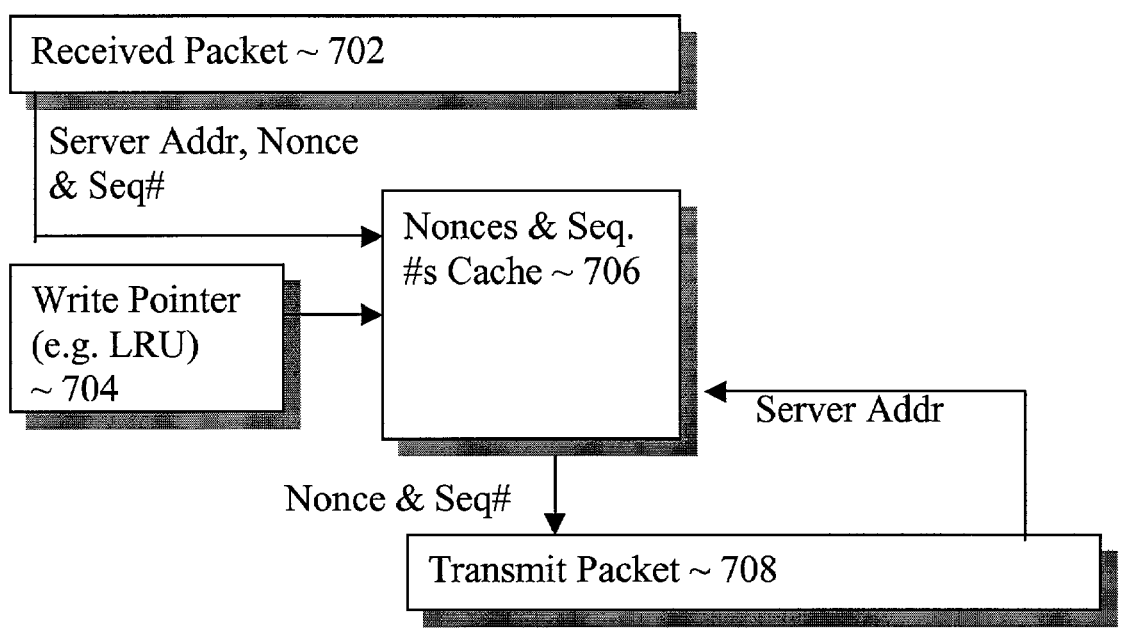

FIGS. 5-7 illustrate-the operational flow of the relevant aspects and the relevant components of a client device, in accordance with one embodiment. The illustrated embodiment also assumes the employment of a nonce as the conversation identifier. In one embodiment, the illustrated relevant components of FIG. 7 are disposed in a communication interface, e.g. a network interface card (NIC), designed to send and receive packets on behalf of the host client device (more specifically, its processor or processors (not shown)).

As illustrated in FIG. 5, as a packet is received, the packet is accepted, i.e. disassembled as in the prior art. However, the disassembly process includes extraction and saving of the server address (i.e. the source address), the included nonce, and the sequence number of the nonce, if employed (block 502).

As illustrated in FIG. 6, as an occasion to send a packet to one of servers 102a-102n arises, the most recent nonce and its sequence number of the destination server is retrieved from the saved nonce and sequence numbers (block 602), and included in the packet to be transmitted to the destination server (block 604). Thereafter, the packet included with the retrieved nonce and sequence number is transmitted (block 606).

As illustrated in FIG. 7, for the embodiment, the relevant components of the communication interface of the host client device include storage cache 706, associated write pointer 704, and a transceiver (not shown). Storage cache 706 is used to store the server addresses, the included nonces and the sequence numbers of the nonces extracted from a packet received by the transceiver. Write pointer 704 is employed to denote the next storage location for use to store the most recently extracted data. In one embodiment, write pointer 704 is "advanced" or set employing a least recently used (LRU) replacement policy. For the illustrated embodiment, storage cache 706 is content addressable, allowing the most recent stored copy of the nonce (and its sequence number) for a server to be output for inclusion in a packet to be transmitted to a server by the transceiver, in response to the provision of the server's address as input. In another embodiment, the sequence number may be used to index the nonces instead. For this embodiment, the server may advance the sequence number periodically. Upon advancement, all nonces having "older" associated sequence numbers are considered "expired". Accordingly, the server and the routing device may signal each other and be synchronized to one another, without resorting to an operationally "expensive" distribution process to distributing keys/secrets to the routing devices.

Routing Devices

Figure 8:
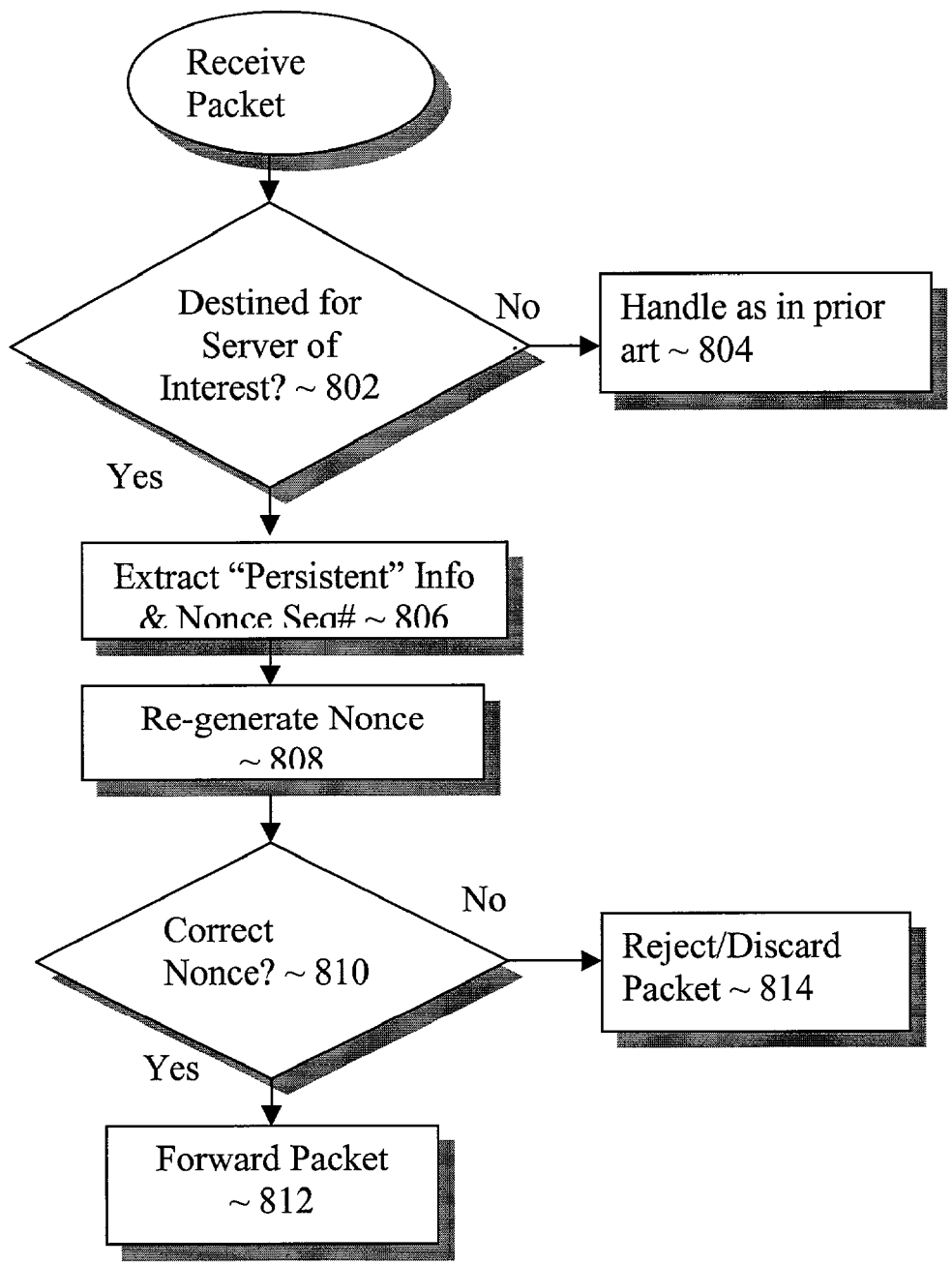
FIGS. 8-9 illustrate the operational flow of the relevant aspects of a routing device, and a component view of the relevant elements of a packet filter of the routing device, in accordance with one embodiment.
Figure 9:
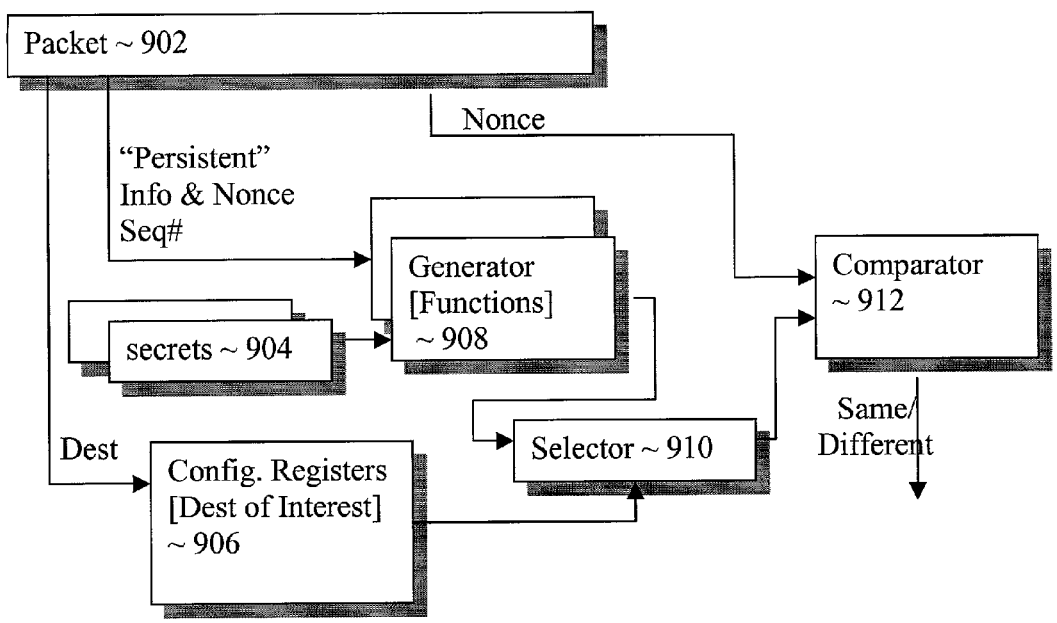

FIGS. 8-9 illustrate the operational flow of the relevant aspects, and the relevant components of a routing device, in accordance with one embodiment. As illustrated in FIG. 8, as an en-route packet is received by an intermediate routing device, the intermediate routing device first determines if the packet is destined for a server of interest, block 802. That is, whether the destination address is addressed to a server the intermediate routing device has been configured to independently detect and filter undesirable packets that are not part of a conversation with the destined server. If the en-route packet is not destined for a server of interest, the en-route packet is simply handled/disposed as in the prior art, block 804.

On the other hand, if the packet is addressed to a server of interest, the intermediate routing device extracts the relevant persistent information, the included nonce, and if applicable, the sequence number of the nonce from the en-route packet, block 806. Thereafter, the intermediate routing device independently regenerates the nonce, block 808. That is, the intermediate routing device would independently re-generate a nonce based on the extracted applicable persistent information and the sequence number, using the pre-configured deterministic function and the pre-provided secret value. Next, the intermediate routing device would compare the extracted nonce and independently re-generate nonce to determine if they are the same, block 810. If the extracted nonce and the independently re-generated nonce are determined to be the same, for the illustrated embodiment, the intermediate routing device would consider the packet to be a part of a conversation between the destined server, and the intermediate routing device would permit the en-route packet to be forwarded and further routed to the destined sever, block 812. However, If the extracted nonce and the independently re-generated nonce are determined to be different, for the illustrated embodiment, the intermediate routing device would consider the packet to be not a part of a conversation between the destined server, and the intermediate routing device would discard or otherwise reject the en-route packet to prevent it from being further forwarded to the destined sever, block 814.

In an alternate embodiment, even after having independently verified the included nonce, the intermediate routing device would further perform a "freshness" test before concluding that the packet is to be considered as a part of a conversation between the transmitting client device and the destined server. In such embodiment, the intermediate routing device would further track a time of first observance for each newly observed nonce. In subsequent observations, upon verification, the intermediate routing device would nevertheless confirm that the packet is a part of a conversation only if the time elapsed since the nonce's first observance has not exceeded a predetermined threshold. If the elapsed time exceeds the predetermined threshold, the nonce will be deemed as "staled", and the en-route packet will nevertheless be deemed as not a part of a conversation between the transmitting client device and the destine server. In alternate embodiments, the "freshness" test may also include the "sequence number" as a factor for performing the test. For example, the "sequence number" may be employed by expiring the old nonces, whenever a routing device sees a packet from the client with a sequence number higher than the last sequence number it has seen for that server. This may also be performed in a windowed fashion, for example, by keeping the last "two" nonces active (i.e. a "current" and "last known good" nonce), and expiring the "last known good" nonce, once the sequence number changes twice.

FIG. 9 illustrates the relevant components of an example intermediate routing device, designed to support multiple servers of interest. That is the intermediate routing device is configured to independently detect and filter undesirable packets for multiple servers. As illustrated, the relevant components include storage cache 906, a number of nonce generators 908, a number of secret value storage registers 904, selector 910 and comparator 912. Storage cache 906 is employed to store the addresses of the servers of interest, i.e. those servers on whose behalf the intermediate routing device is to independently detect and filter out undesirable packets. Storage cache 906 takes the destination address of the en-route packet as input, and outputs a signal denoting whether the destination address matches one of the stored addresses of the server of interest. Further, for the embodiment, the "match" signal also identifies the "matching" server, to facilitate selection of the proper secret value register and generator pair for use to independently re-generate the nonce to make the conversation determination.

Secret value storage registers 904 are employed to store the corresponding secret values employed by the servers of interest to generate the corresponding nonces for conversation identification. Similarly, generators 908 are configured to independently re-generate nonces in the manner the servers of interest would generate nonces. That is, each generator 908 is configured with a deterministic function of one of the servers of interest. In one embodiment, generators 908 are implemented with reconfigurable Field Programmable Gate Arrays (FPGAs). In other embodiments, generators 908 are implemented with microcontrollers having re-programmable control stores to be re-programmed with micro-instructions to effectuate the appropriate deterministic functions.

Similar to the manner a server would generate a nonce, each generator 908 accepts the extracted applicable persistent values (and if applicable, the included sequence number) of the en-route packet, and a pre-provided secret value as inputs, and outputs a nonce. For the illustrated embodiment, selector 910 selects one of the outputs of generator 910 for use by comparator 912 to determine whether the en-route packet is part of a conversation with the destined server.

Comparator 912 takes the included nonce in the en-route packet and the selected independently generated nonce as inputs, and outputs a signal denoting whether the extracted and independently re-generated nonces are the same or different. As described earlier, if the two nonces are the same, the en-route packet is deemed to be a part of a conversation with the destined server (unless the optional "freshness" test is to be performed), and the en-route packet will be permitted to be further forwarded to the destined server. However, if the two nonces are different, the en-route packet is deemed to be not a part of a conversation with the destined server, and the en-route packet will not be permitted to be further forwarded to the destined server.

In alternate embodiments, an intermediate routing device may be equipped with only one nonce generator, thereby servicing only servers employing the same deterministic functions for nonce generation. For these embodiments, selector 910 may be employed to select one of the secret values as input to the only nonce generator instead. In yet other embodiment, an intermediate routing device may be equipped with only one single set of secret value register and nonce generator, thereby servicing only one server. For these embodiments, a single register may be employed to store the address of the server being serviced as opposed to cache 906.

Conclusion and Epilogue

Thus, it can be seen from the above descriptions, a novel method and apparatus for independent detection and filtering of undesirable packets has been described. While the present invention has been described in terms of the above illustrated embodiments, those skilled in the art will recognize that the invention is not limited to the embodiments described. The present invention can be practiced with modification and alteration within the spirit and scope of the appended claims. For examples, as alluded to earlier, the present invention may be practiced with more or less servers, routing devices and client devices. Thus, the description is to be regarded as illustrative instead of restrictive on the present invention.

What is claimed is:

1. In a routing device, a method of operation comprising:
   receiving a packet sent by a client device;
   determining if the packet is destined for a server of interest by reference to a destination address of the packet;
   if the packet is not destined for the server of interest, routing the packet to its destination;
   if the packet is determined to be destined for the server of interest, independently determining whether said packet is a part of a conversation between the client device and the server of interest based at least in part on persistent information included in said packet; and
   handling the packet based at least in part on the result of said independent determination by forwarding the packet to the server of interest if the packet is deemed to be a part of a conversation between the client device and the server and dropping the packet if the packet is deemed to be an undesirable packet; wherein said independent determination comprises independently verifying a conversation identifier included in said packet based at least in part on other information included in said packet, in which said independent verification comprises independently regenerating the conversation identifier using at least said other information included in said packet and comparing the independently re-generated conversation identifier with the included conversation identifier; said conversation identifier being a nonce, and said independent re-generation comprising independently re-generating the nonce using a deterministic function with a sequence number of the nonce and a plurality of persistent field values extracted from the packet, and a pre-provided secret value as inputs to the deterministic function;

recording a time of first observation for the nonce if the nonce is a newly observed nonce; and determining if time has elapsed more than a predetermined threshold since a time of first observation was recorded for the nonce, if the extracted nonce and the independently generated nonce are deemed to be the same and dropping the packet if the time has elapsed more than the predetermined threshold even though the extracted nonce and the independently generated nonce are deemed to be the same.

2. The method of claim 1, wherein said plurality of persistent field values comprise one or more of a source address, a destination address and a port number.

3. The method of claim 1, wherein the method further comprises at least one of receiving into said routing device said secret value, and equipping/configuring said routing device with said deterministic function.

4. The method of claim 1, wherein said independent generation is performed using a selected one of a message authentication code function and an universal hash function.

* * * * *